June 28, 1938.   C. A. HOVDE   2,122,286
POWER OPERATED DEPTH CONTROL FOR DISK PLOWS
Filed May 19, 1937   2 Sheets-Sheet 1
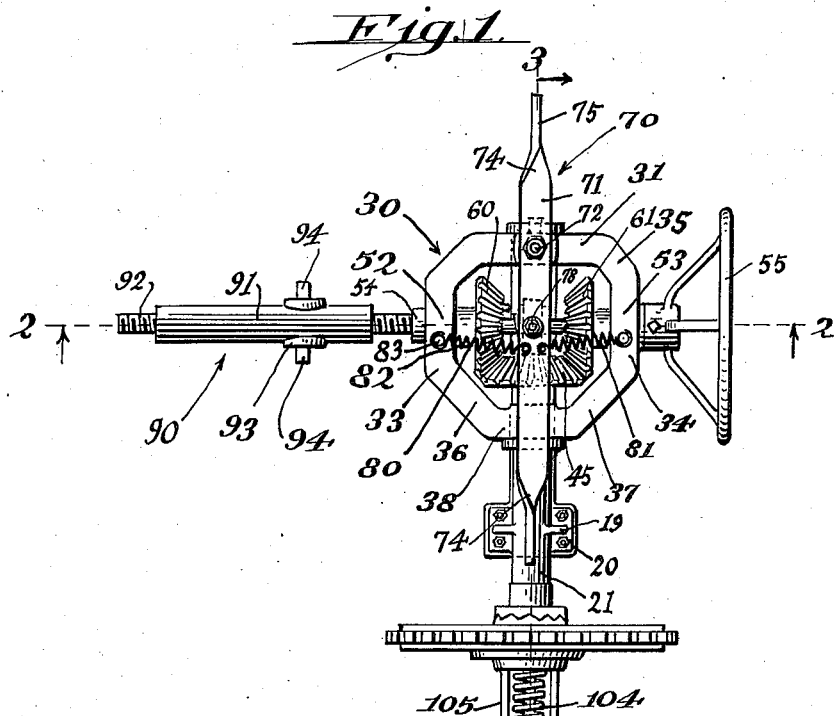
Fig.1.
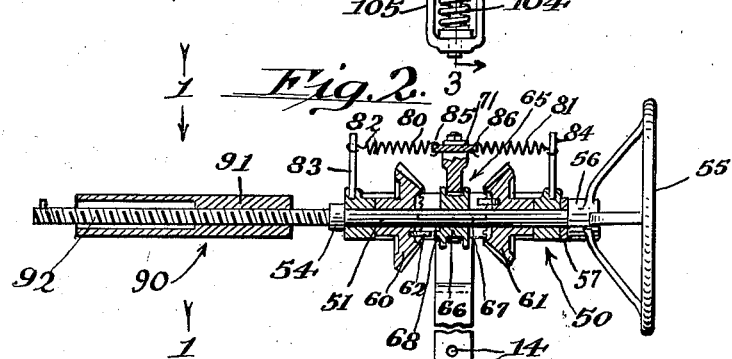
Fig.2.
Fig.3.
Inventor
Chester A. Hovde
by Hazard and Miller
Attorneys

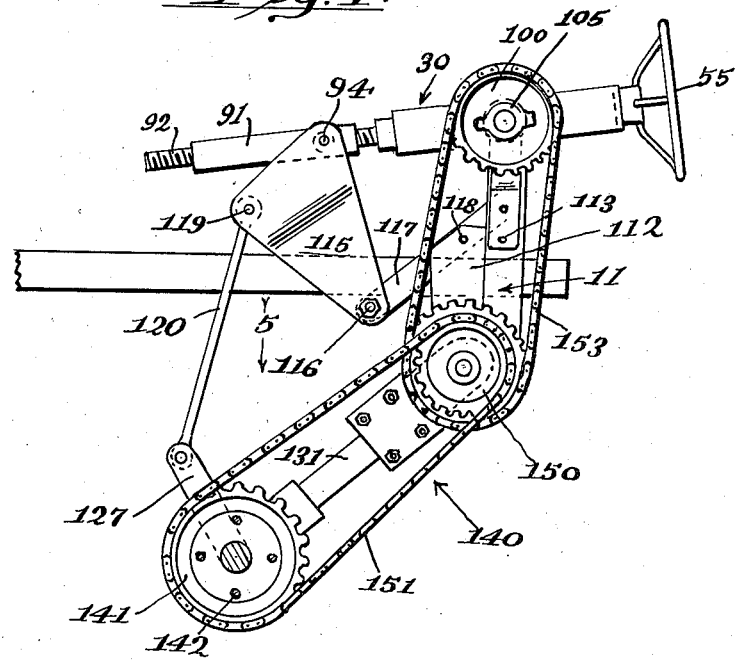
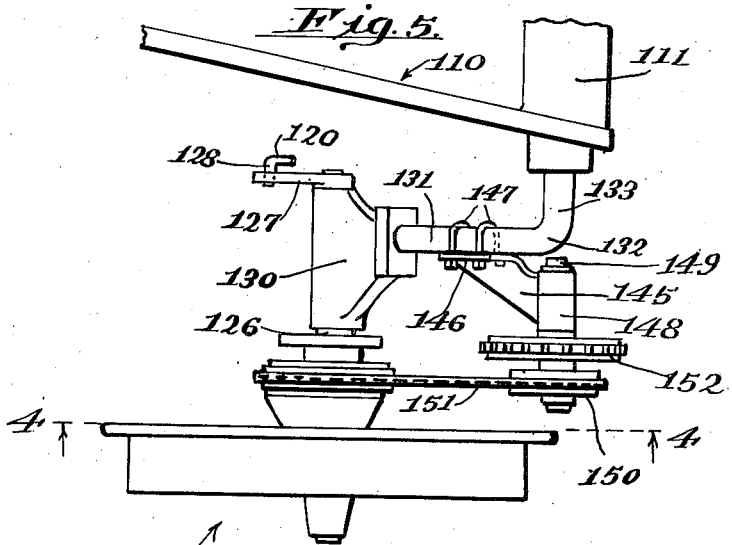

Patented June 28, 1938

2,122,286

UNITED STATES PATENT OFFICE 2,122,286

POWER OPERATED DEPTH CONTROL FOR DISK PLOWS

Chester A. Hovde, Mesa, Ariz.

Application May 19, 1937, Serial No. 143,506

15 Claims. (Cl. 97—73)

My invention relates to equipment for controlling the depth of operation of disk plows while the plow is being towed by a tractor or the like and in which the operator of the tractor may actuate the depth control mechanism, this being power operated. By the term "depth control" I mean the raising and lowering of the assembly of disks as a unit and an equal amount from end to end of the plow assembly to obtain the desired depth of cut or plowing. Most of the tractor drawn plows now on the market have equipment for raising the plow assembly clear of the ground or lowering it to a predetermined depth by the tractor operator when the plow is in motion. Most disk plows also have a secondary mechanism for controlling the depth of cut of the disk assembly. This is usually done by requiring the stoppage of the machine and the operator of the tractor walking to the rear end of the plow and actuating the control devices. This change of depth of plowing is necessary as in the usual disk plow there is a front furrow wheel which follows in the furrow made by the previous run of the plow and a rear furrow wheel which follows the track cut by the rear disk. The land wheel runs on the unplowed land. Therefore if the soil condition changes although the frame has been initially set to have a more or less predetermined depth of cut, nevertheless some places the plow will cut too deep and other places make too shallow a cut. For instance, in soft soil the disks will sink and cut altogether too deep whereas in harder soil as they cannot cut so deep, the disks tend to lift the frame.

As it requires considerable time for an operator to stop his tractor and walk to the rear end of the plow to make the adjustments to control the depth and then return to the tractor and start operating, my invention comprehends a control mechanism which may be actuated by the operator of the tractor while the tractor is in motion. The power for raising and lowering the disk assembly is derived from the rotation of the land wheel on the unplowed ground and through the medium of a clutch and gears the one direction motion derived from the land wheel may be utilized for reverse motions for either raising or lowering the plow assembly according to the type of soil encountered in a particular run of the plow. Considered in more detail, my invention includes a simple control by having a gear or pinion continuously driven in one direction by a chain or equivalent drive from the land wheel, then by means of two ropes extending rearwardly from the tractor, the operator by pulling on one or the other rope can shift a clutch to engage either of two gears driven in reverse direction by the pinion and thus rotate a shaft in a direction for raising the plow assembly or in the reverse direction for lowering such assembly. Therefore considered somewhat broadly, my invention comprehends a flexible type of control for a clutch including a constantly driven gear meshing with reverse direction gears, the clutch being operative to engage the latter gears with a shaft and this shaft actuates the raising and lowering mechanism of the plow to secure the correct depth.

In certain types of plows the rotatable levelling shaft is ordinarily hand operated by a levelling crank or hand wheel and in its rotation causes the movement of a sleeve internally threaded and engaging external screw threads on the shaft. The depth adjustment mechanism in its operation causes an oscillation of the levelling shaft in a vertical plane, this turning on a pivot. In any type of power drive which substitutes power derived for instance from the rotation of the land wheel instead of the hand crank or hand wheel, it is necessary to make provision for this vertical oscillation.

Therefore another object and feature of my invention is a construction by which the levelling shaft may have this vertical oscillating movement on the axis of the continuously driven pinion, this pinion being mounted on a shaft supported in a suitable frame and such pinion shaft is preferably driven by a double chain or equivalent drive from the land wheel.

My invention also comprehends a flexible control of the position of the clutch by a flexible connection such as ropes leading to the tractor and these operate a pivoted clutch shifter bar which on the pull of one rope interengages the clutch sleeve with one of the driven gears turning in one direction and a pull on the other rope engages the same clutch sleeve with the other gear rotating in a reverse direction. A detail feature of my invention includes a spring connection to the pivoted bar normally retaining this bar and the clutch sleeve in a neutral position.

Another detail feature of my invention is the employment of a slip ratchet type of drive between the land wheel and the bevel pinion so that when the internally threaded sleeve on the levelling shaft is moved to its extreme limits and then is stopped or if for any other reason the depth adjustment mechanism becomes jammed, the ratchet drive clutch slips and thus prevents damage to any parts of the mechanism. The slipping of the clutch therefore does not affect the change of the depth of cut of the plow assembly.

My invention is illustrated in connection with the accompanying drawings, in which:

Fig. 1 may be considered as a plan of part of the sleeve operating mechanism with the reverse drive clutch as if taken in the direction of the arrow 1 of Figs. 2 or 3.

Fig. 2 is a longitudinal section on the line 2—2 of Fig. 1 with parts being shown in elevation.

Fig. 3 is a transverse section on the line 3—3 of Fig. 1, certain parts being shown in elevation.

Fig. 4 is a side elevation to show the sprocket chain drive taken substantially on the line 4—4 of Fig. 5.

Fig. 5 is a plan of the lower portion of the chain drive taken in the direction of the arrow 5 of Fig. 4, certain of the upper parts being omitted.

In my adaptation or application of my invention to plows of various types now on the market and these may be a disc or for instance, a gang type of mold-board plow, I utilize a supporting frame or bracket designated by the assembly numeral 11. This is shown as having two parallel straps 12 and 13 with bolt holes 14 adapted to replace a bracket now used on a certain type of plow, the frame being secured as a replacement to such bracket. The strap 12 has an arm 15 which in installation is substantially horizontal and has an upturned post 16. The strap 13 has a horizontal arm 17 in substantially horizontal alignment with the arm 12 and this has an upright post 18 and a journal post 19, this latter having a flanged base 20 for bolting to the arm 17. The bearing block 21 is of considerable length and thus supported by the posts 18 and 19 and above the arms 15 and 17. The post 16 has a perforation 22 and the posts 18 and 19 have a similar perforation 23. These perforations and the center of the bearing are in axial alignment.

A frame assembly 30 has one side 31 with a pivot stud 32 extending therefrom and pivoted in the perforation 22 of the post 16. Positioned at right angles to the side 31 there are two opposite sides 33 and 34 connected by curved or rounded corners 35 to the side 31. There are additional converging sides 36 and 37 and a transverse short end 38 parallel to the side 31. This latter side 38 has an opening 39 therethrough through which extends a drive shaft 40. The further details of the functions of such shaft are hereinunder detailed. Thus the frame 30 is pivoted on the shaft 40 and the stud 32 and as above mentioned, these are in alignment. Thus the frame may tilt or incline on the axis of the drive shaft 40, extending through a perforated stud 40'.

The drive shaft 40 has a driving bevelled gear 45 thereon located inside of the frame and having a neck 46 operating in a thrust manner against the side 38 of the frame 30. The screw shaft to be located and designated by the assembly numeral 50 has a cylindrical portion 51 mounted in journal portions 52 and 53 in the sides 33 and 34 respectively of the wall 30. A collar 54 at one end confines the screw shaft from longitudinal movement. In order to rotate this by hand, a hand wheel 55 is attached to the outer end of this shaft and this has a hub 56, there being preferably a thrust washer 57 between the hub and the side 34, thus restricting the longitudinal movement of the screw shaft.

Mounted for free rotation on the cylindrical section 51 of the shaft 50 there are two similar bevel gears 60 and 61, each of which has an inwardly extending pin 62 forming part of a clutch element. A clutch sleeve 65 has a reduced diameter neck portion 66 and is slidably mounted on the cylindrical section 61 of the shaft and by means of a spline or key-way 67 rotates with the shaft. This slidable clutch has studs 68 complementary to and positioned to engage the clutch pins 62 on either of the gears 60 or 61.

The clutch operating assembly designated by the numeral 70 employs a double lever arm 71 having its fulcrum 72 on a lug 73 extending upwardly from the side 31 of the open frame 30. This is illustrated as being made of a flat bar with one-quarter turns 74 and vertical end portions 75 to which ends at the perforations 76 there are connected two ropes or cables which extend to the towing tractor used with a plow. A clutch operating arm 77 is connected by a bolt 78 to the clutch lever 71 and this has a clutch yoke 79 fitting in the neck 60 of the clutch sleeve 65. In order to maintain the clutch sleeve in its neutral position I employ balancing springs 80 and 81. The spring 80 has its outer end 82 secured to a pin 83 extending upwardly from the side 33 of the frame 30 and the spring 81 has its outer end secured to a similar pin 84 extending upwardly from the side 34 of this open frame 30. The inner ends of the springs are connected to eyes or the like 85 and 86 on the portion of the strap forming the lever 71. It will therefore be understood that when the lever is moved by pulling one rope or the other that the clutch sleeve 65 may be shifted longitudinally of the cylindrical parts 51 of the screw shaft assembly 50 and thus the clutch brought into locking engagement with either of the bevel gears 60 or 61 which are driven by the bevel pinion 45, this being a constant drive. In this manner as the gears 60 and 61 thus rotate in opposite directions the screw shaft 50 may be rotated in opposite directions. On release of the tension on a rope the springs 80 and 81 bring the clutch sleeve to its center or neutral position.

The purpose of the reverse rotation of the screw shaft 50 is to cause the longitudinal movement of a sleeve assembly 90 which employs an internally threaded sleeve 91 engaging the threaded portion 92 of the screw shaft 50. This sleeve has a pair of diametrically opposite bosses 93 with diametrically aligned pivot studs 94. The purpose and function of such studs is detailed hereinunder as connected to a part of the present mechanism of a plow or similar machine so that on movement of the sleeve assembly 90 in one direction or the other the various plows may be raised or lowered for plowing to the desired depth depending on the type of soil.

The power drive is transmitted to the drive shaft 40 and hence to the beveled pinion 45 by means of a driven sprocket gear 100 (note particularly Figs. 1 and 3). This gear is loosely mounted on the end of the shaft and is connected for driving purposes through a self releasing ratchet 101 having a head 102 secured to the shaft 40 and a complementary toothed flange 103 attached to the sprocket. A spring 104 confined in a yoke 105 maintains a tight connection between the toothed head 102 and the complementary toothed flange 103, this being a common expedient in a slip clutch drive. This is utilized so that if for instance the plow frame is elevated to its limit or depressed to a limit, that the sprocket gear 100 will slip on the shaft 40 without transmitting rotational motion to such shaft to thereby eliminate any danger of breakage.

In Figs. 4 and 5 I illustrate part of a well known disc plow such as that designated in the prior portions of the specification. Such plow has a rigid longitudinal frame beam 110 to which the discs are attached. There is also a rear frame member 111 secured to the end of the beam 110. A fixed vertical plate 112 is also attached to the frame member 111 and thus to the beam 110 and it is to such plate that the straps 12 and 13 are bolted as by bolts 113. The plow construction also has a bell crank 115 which is illustrated in the manner of two spaced plates to which the fixed pivot 116 is secured to a strap 117, bolted at 118 to the fixed plate 112 and also secured by one of the bolts 113 and thus held in a rigid position as regards the straps 12 and 13 and therefore the frame or bracket assembly 11. The studs 94 are connected to the upper corner of the bell crank plate assembly 115 and at the other corner there is a pivot 119 from which extends an operating link 120.

The plow above designated has a ground wheel assembly 125 (note Fig. 5) which rolls on the unplowed ground. This has an axle assembly 126. Intermediate the axle assembly and the wheel there is an equipment for raising the plow frame to entirely lift the disc plows out of the ground for transportation without the plowing operation. This does not form any part of my invention and my construction interferes in no manner with this controlled lift and lowering of the assembly by the action of the ground wheel. The axle assembly has an arm 127 connected thereto and the lower end 128 of the link 120 is pivotally connected to such arm. The plow machine also has a hub structure 130 through which the axle assembly extends and from this there extends a radial arm 131 which is bent as indicated at 132 having a shaft end portion 133. This shaft end portion has a bearing in the plate assembly 112 and thus the rear frame member 111 and has a rotational mounting in reference to the frame beam 110.

In order to provide a drive connection from the ground wheel 125 I connect a sprocket chain drive assembly designated 140. This has a driving sprocket 141 which may be bolted to the wheel hub or to a part driven by the ground wheel 125, the connection being by means of bolts connected to the bolt holes 142. A shaft journal bracket 145 has a clamping base 146 secured by U shaped bolts 147 to the radial arm 131. The bracket has a journal box 148, the center of which is located in axial alignment with the shaft portion 133. A shaft 149 or if desired, a stud, is mounted in this hub or journal section 148 and carries a first driven sprocket gear 150 which is driven by a sprocket chain drive 151 from the sprocket 141. A second driving sprocket 152 is mounted on the shaft 149 or the stud and is connected to be located by the sprocket 150 and this has a chain drive 153 leading upwardly to the driven sprocket 100.

It will be seen by this drive connection that the axis of the sprockets 150 and 152 is in axial alignment with the shaft section 133. Therefore the arm 131 with the wheel shaft and ground wheel may have a relative up and down movement in reference to the frame of the plow and as the ground wheel is maintained in a constant position, the plow frame may be raised and lowered.

This action is as follows: When the screw shaft is rotated, the threaded portion 92 causes a longitudinal movement in one direction or the other of the sleeve 91 which sleeve on account of having the studs 94 pivoted to the bell crank 115, rocks this bell crank on its fixed pivot 116. This gives a movement to the tension or thrust link 120 and develops an arcuate movement in the arm 127. This action gives a pivoting movement of the hub structure 130 with its rigidly connected arm 131 in reference to the axle of the drive or ground wheel 125. The action also causes a rotation of the shaft end 133 in reference to the main frame of the plow. Thus there is developed an action of raising or lowering the rear end of the plow frame in reference to the ground wheel which as it operates on the unplowed ground surface, gives a raising or lowering action to the plow frame. In the type of plow to which my equipment applies and other plows of the same type, the raising and lowering of the rear end of the plow frame in reference to the ground wheel, also through various types of connections raises and lowers the front end of the plow carrying a frame so that the discs or other types of plows may all be simultaneously adjusted either upwardly or downwardly in accordance with the depth of cut desired to be made. It will be seen therefore that by my equipment and having the cable control leading from the double lever assembly 71, that I use the power from the ground wheel to adjust the depth of plowing and that while the machine is in operation pulled by a tractor, I may readily vary the depth to which the plows cut, raising these upwardly to give a shallower cut when this is necessary on account of the condition of the soil and again lowering them for a greater depth of cut when the soil permits or this is desirable. It will be seen therefore that it is not necessary to stop the tractor and hence the plowing to make the adjustments as required for depth as the plowing operation progresses over a field.

It will be obvious that the journal box 148 may be mounted on an extension of the shaft end portion 133 instead of utilizing a journal bracket such as 145. It is believed also obvious that the shaft portion 133 may be extended on opposite sides of the radial arm 131 and the second driving sprocket 152 may be rotatably mounted on such extension and interconnected for a drive from the sprocket 150, also rotatably mounted on the extension of the shaft portion 133.

The arm 127 forms part of the equipment for entirely raising or lowering the plow assembly in regard to the ground wheel controlled by the equipment now installed in the standard plow and hence the arm 127 occupies either a more or less upright or a downward position. This equipment holds the arm 127 in either one or other of these positions in relation to the radial arm 131. Hence when the link 120 is pulled upwardly or thrust downwardly due to the action of the sleeve 91 and the bell crank 115, the radial arm 131 and the arm 127 move as a unit in an arcuate motion on the axis of the shaft portion 133.

Various changes may be made in the details of the construction without departing from the spirit or scope of the invention as defined by the appended claims.

I claim:

1. In a device as described, the combination of a supporting structure, a frame pivotally mounted therein, a driving shaft in alignment with one of the pivots of the frame, a rotatably driven shaft journalled in the frame and a combined clutch and drive mechanism for inter-engaging the driving shaft rotating in one direction to the driven shaft to rotate the driven shaft in opposite directions, the said pivotal mounting of the frame permitting the driven shaft to operate at various inclinations in reference to the supporting structure, the driven shaft having a screw thereon, a threaded sleeve engaging the screw and adapted to be moved in opposite directions on the screw of the driven shaft in accordance with its direction of rotation, the said sleeve having a pivotal connection to an oscillating structure, the pivotal connection of the sleeve to such oscillating structure being adapted to vary the inclination of the driven shaft having the screw.

2. In a device as described, a supporting structure, a frame pivotally mounted therein, with pivots on opposite sides of the frame, a driven shaft extending through one of the pivots and being in alignment with the other pivot, said shaft being driven in one direction only, a driving gear mounted on said shaft, a driven screw threaded shaft journalled in the said frame, a pair of complementary gears rotatably mounted on the driven shaft, and in mesh with the driving gear, a slidable clutch element on the driven shaft with means to move said clutch element to engage or dis-engage the complementary gears whereby when in clutch engagement with one of said complementary gears the screw shaft rotates and threads in one direction and when in engagement with the opposite complementary gear rotates and threads in the opposite direction and when the clutch element disengages both of the gears the said screw shaft remains stationary as to rotation, a sleeve threaded on the screw portion of the driven shaft and having a pivotal connection to an oscillating structure, said oscillating structure having a fixed pivot at one point, the pivotal connection at the sleeve at another point and a third pivotal connection to a structure to have movement relative to the supporting structure for the frame whereby on a driving rotation of the driven screw shaft the said frame turns on its pivots and the screw shaft develops a change of inclination in reference to the structure supporting the frame.

3. In a device as described, the combination of a supporting bracket adapted to be rigidly secured to a structural part of a machine, a frame assembly having a central opening with the opposite sides journalled in said bracket, the journals being in alignment, a driving shaft extending through one of the journals, said driving shaft being rotated in one direction, a driving bevel gear on the driving shaft, a driven shaft having a cylindrical section journalled in the ends of the frame at right angles to the driving shaft and having a screw thread extending beyond said frame, a pair of secondary gears rotatably mounted on the cylindrical section of the driven shaft inside of the opening of the frame and constantly meshing with the driving gear, a clutch element slidably mounted on the cylindrical section of the shaft and having means to form a drive connection with either of the secondary gears or to be located at a neutral position as to such gears and thereby rotate the driven screw shaft in opposite directions or to render such shaft stationary and an operative mechanism having a threaded connection with the screw of the driven shaft to actuate a part of the machine and in such actuation develop a tilting movement of the driven shaft having the screw relative to the supporting bracket.

4. In a device as described and claimed in claim 3, the machine having a shaft rotatably mounted therein and having a radial arm, a ground engaging wheel having an axle structure journalled in said arm, the operative connection from the screw having a connection to the axle structure whereby the rotation of the driven shaft and the change of inclination thereof develops an up and down movement of the frame of the machine in reference to the ground engaging wheel.

5. In a device as described in which an implement frame is provided with a crank shaped arm having a shaft portion journaled in the frame, a substantially radial arm extending therefrom, a hub structure on the end of the arm, an axle assembly journaled in the hub structure and having a second arm connected to the axle structure at one portion and a ground wheel mounted on the axle structure at another portion, a bell crank having one pivot mounted in a fixed relation to the frame and having a link connected from a second pivot to the second arm, a third pivot of the bell crank being connected to an internally threaded sleeve combined with a bracket assembly secured in a fixed position on the implement frame, a gear frame assembly pivotally mounted on the bracket or pivots transverse to the sleeve, a driving shaft in alignment with one of the pivots and having a beveled pinion thereon, a driven shaft having a screw journaled in the gear frame and having two gears meshing with the pinion, a clutch element rotatable with the threaded shaft and slidably mounted thereon to form a clutch engagement with either of the gears on the shaft, the screw engaging the internal threads of the sleeve and a drive from the road wheel to the driving shaft having the pinion.

6. In a device as described and claimed in claim 5, the drive connection from the road wheel including an idler sprocket gear assembly mounted on a shaft, such shaft having a journal bracket connected to the crank-like shaft and in axial alignment with the shaft portion thereof, a sprocket chain drive from the ground wheel to the said sprocket gear assembly and a second sprocket chain drive from the sprocket gear assembly to a sprocket gear mounted on the driving shaft having the pinion.

7. In a device as described, the combination of an implement frame having a first shaft journaled therein, the said shaft being horizontal, a radial arm extending from the shaft and having a hub structure, an axle assembly journaled in the hub structure and having a ground wheel rotatably mounted thereon at one end and a second arm connected thereto at another portion, a bell crank having one pivot in a fixed relation to the implement frame and parallel to the said first shaft, a second pivot in the bell crank being connected by a link to the said second arm, an internally threaded sleeve having a pivotal connection to a third pivot of the bell crank, a bracket attached to the implement frame having a gear frame journaled thereon, said journal being parallel to the first shaft, a driving shaft having a pinion gear extending through one of the pivots of the gear frame, a screw shaft having a screw threaded portion engaging the sleeve and a cylindrical portion journaled in the gear frame at right angles to the driving shaft and having a pair of complementary gears rotatably mounted thereon constantly meshing with the pinion, a clutch sleeve keyed to the cylindrical portion of the screw shaft to rotate therewith but slidably mounted thereon, complementary clutch devices between the clutch sleeve and each of the complementary gears, a manually operated means to slide the clutch sleeve to bring either of the complementary gears into driving relation with the screw shaft and a spring means to return the clutch sleeve to its neutral position and a drive from the ground wheel to the shaft having the pinion gear.

8. In a device as described and claimed in claim 7, the drive connection from the ground wheel to the shaft having the pinion gear including a journal bracket secured to the radial arm extending from the first shaft and having a hub in axial alignment with the first shaft, an idler sprocket gear assembly having a journal mounting relative to the axis of the hub, a driving sprocket gear connected to the ground wheel, a first sprocket chain having a drive therefrom to the idler sprocket assembly, a second sprocket chain drive from the idler sprocket assembly to a driven sprocket gear mounted on the shaft having the pinion.

9. In a device as described and claimed in claim 7, the manually operated means to slide the clutch sleeve including a double lever arm having a pivotal mounting on the gear frame and a connection to the clutch sleeve and cables extending from the opposite ends of said double lever and adapted to extend to a tractor used to tow the implement frame.

10. In a device as described in which an implement frame is provided with a ground wheel having an axle assembly and a crank-like connection from the axle assembly to the frame whereby at different inclinations of the crank-like connection the frame occupies different positions in reference to the ground level combined with a first sprocket chain drive from the ground wheel to an idler gear assembly, said idler gear assembly being journaled in axial alignment with the crank connection to the implement frame, a second sprocket chain drive from the idler assembly to driven sprocket gear, said driven sprocket gear being mounted on a driving shaft and means to journal said driving shaft in a fixed relation to the implement frame, a rotatable shaft journaled in a frame, the journals of the frame being in axial alignment with the driven shaft and reversing clutch assembly and gear drive interconnecting the driving shaft with the pivoted shaft to rotate said pivoted shaft in opposite directions or to retain said shaft in a neutral position and an operative connection between the pivoted shaft and the axle assembly to change the inclination of the crank-like connection for raising or lowering the implement frame in reference to the ground wheel.

11. In a device as described and claimed in claim 10, the reversing clutch assembly and gear drive to the pivoted shaft comprising two gears loosely rotatable on the pivoted shaft and meshing with a gear on the driving shaft, a clutch element having a rotating drive to the pivoted shaft and slidable thereon to occupy a neutral position or to engage either of the gears rotatable on the pivoted shaft whereby said latter shaft may be rotated in opposite directions.

12. In a device as described in which an implement frame has a crank-like shaft connection to an axle assembly carrying a ground wheel, a rotatable levelling shaft pivotally mounted in a journal structure, said journal structure being mounted in a fixed relation to the implement frame and parallel to the crank portion of the said crank-like connection and in which there is a raising and lowering connection between the levelling shaft and the axle assembly combined with a driving shaft mounted on a journal in axial alignment with the pivot of the levelling shaft, a gear connection from the ground wheel to the driving shaft to rotate said shaft in one direction, a combined clutch and driving assembly between the driving shaft and the levelling shaft to at will rotate said shaft in opposite directions or to retain said levelling shaft non-rotating when the clutch part of the clutch and gear assembly is in a neutral position.

13. In a device as described and claimed in claim 12, the gear drive between the ground wheel and the driving shaft including a first gear connection from the ground wheel to an idler gear assembly mounted on a journal in alignment with the crank part of the crank shaft connection from the implement frame to the axle assembly and a second gear connection from the idler gear assembly to the driving shaft.

14. In a device as described, the combination of a bracket adapted for attachment to a vehicle frame, a gear frame having a central opening with a threaded shaft journaled therein having a cylindrical part in the opening of the frame and a threaded portion extending beyond the gear frame, a pair of complementary gears freely rotatable on the cylindrical part of the said shaft located inside of the opening, a clutch sleeve splined to the said shaft and slidably mounted thereon, a double lever pivotally mounted on the gear frame and having a connection to the clutch sleeve, cables connected to opposite ends of the double lever and adapted to lead to a tractor and a gear drive connection to the complementary gears having a driving shaft mounted in axial alignment with the pivots or journals of the said gear frame whereby the threaded shaft may be rotated in opposite directions or when the clutch sleeve is in a neutral position, such shaft being non-rotatable.

15. In a device as described and claimed in claim 14, an internally threaded sleeve mounted on the threads of the threaded shaft, a ground wheel having an adjustable mounting in relation to the implement frame and an operating connection between the ground wheel and the said sleeve to change the elevation of the implement frame in reference to the axle of the ground wheel on reverse rotations of the screw shaft, the said gear frame and screw shaft being changed in its inclination in reference to the implement frame.

CHESTER A. HOVDE.